(12) United States Patent
Bloom et al.

(10) Patent No.: US 11,677,731 B2
(45) Date of Patent: Jun. 13, 2023

(54) ADAPTIVE AUTHENTICATION

(71) Applicant: Wells Fargo Bank, N.A., San Francisco, CA (US)

(72) Inventors: Harlan H. Bloom, Saint Charles, MO (US); Lizmari Brignoni, Gilbert, AZ (US); Mark David Castonguay, Corte Madera, CA (US); Lisa Munter Clarke, Greenbrae, CA (US); Upul D. Hanwella, San Francisco, CA (US); Traci H. Nguyen, San Francisco, CA (US); Erica Ulrich, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 411 days.

(21) Appl. No.: 16/861,905

(22) Filed: Apr. 29, 2020

(65) Prior Publication Data

US 2021/0344659 A1    Nov. 4, 2021

(51) Int. Cl.
*H04L 29/06*      (2006.01)
*H04L 9/40*       (2022.01)
(Continued)

(52) U.S. Cl.
CPC ......... *H04L 63/08* (2013.01); *G06Q 20/1085* (2013.01); *G06Q 20/3276* (2013.01); *G06Q 20/4012* (2013.01); *H04W 12/06* (2013.01)

(58) Field of Classification Search
None
See application file for complete search history.

(56) References Cited

U.S. PATENT DOCUMENTS 7,886,346 B2    2/2011  Sandhu et al.
8,261,336 B2    9/2012  Gasparini et al.
(Continued)

FOREIGN PATENT DOCUMENTS

CN    107172049 A    9/2017
EP      3120282 B1   7/2019
(Continued)

OTHER PUBLICATIONS

"Adaptive Authentication Superior User Experience and Growth Through Intelligent Security (White Paper)", OneSpan, (2018), 13 pgs.
(Continued)

*Primary Examiner* — Richard A McCoy
(74) *Attorney, Agent, or Firm* — Schwegman Lundberg & Woessner, P.A.

(57) ABSTRACT

Systems and techniques for an adaptive authentication system are described herein. In an example, an adaptive authentication system is adapted to receive a request at a first entity from a second entity for secure data of a user, where the second entity is remote from the first entity. The adaptive authentication system may be further adapted to transmit a prompt to a user device associated with the user for authentication of the user and authentication of the request. The adaptive authentication system may be further adapted to receive a response to the prompt and authenticate the user and the request based on the response. The adaptive authentication system may be further adapted to transmit the secure data of the user to the second entity.

17 Claims, 5 Drawing Sheets

(51) Int. Cl.
   *H04W 12/06*   (2021.01)
   *G06Q 20/40*   (2012.01)
   *G06Q 20/32*   (2012.01)
   *G06Q 20/10*   (2012.01)

(56) References Cited

U.S. PATENT DOCUMENTS

| | | | |
|---|---|---|---|
| 8,572,391 | B2 | 10/2013 | Golan et al. |
| 8,646,060 | B1 | 2/2014 | Ben Ayed |
| 8,701,199 | B1 | 4/2014 | Dotan et al. |
| 8,955,076 | B1 | 2/2015 | Faibish et al. |
| 9,069,976 | B2 | 6/2015 | Toole et al. |
| 9,282,094 | B1 | 3/2016 | Hunold et al. |
| 9,306,934 | B2 | 4/2016 | Phegade et al. |
| 9,374,369 | B2 | 6/2016 | Mahaffey et al. |
| 9,396,320 | B2 | 7/2016 | Lindemann |
| 9,639,689 | B1 | 5/2017 | Herskovic et al. |
| 9,654,477 | B1 | 5/2017 | Kotamraju |
| 9,917,846 | B1 | 3/2018 | Magi Shaashua et al. |
| 10,013,694 | B1 | 7/2018 | Israeli et al. |
| 10,147,065 | B1 | 12/2018 | Yiftachel et al. |
| 10,223,520 | B2 | 3/2019 | Oberheide et al. |
| 10,504,103 | B2 * | 12/2019 | DeSoto ............... G06Q 20/202 |
| 10,698,995 | B2 * | 6/2020 | Tussy ................ G06Q 20/3276 |
| 10,747,868 | B2 * | 8/2020 | Bock ...................... G06V 10/95 |
| 10,885,220 | B2 * | 1/2021 | Sharma ................ H04L 63/083 |
| 11,494,747 | B2 * | 11/2022 | Benkreira ............ G07F 19/206 |
| 2003/0200172 | A1 * | 10/2003 | Randle ................... H04L 69/08 705/39 |
| 2010/0169952 | A1 | 7/2010 | Mäki et al. |
| 2012/0160912 | A1 * | 6/2012 | Laracey ............. G06Q 20/3274 235/379 |
| 2013/0049928 | A1 * | 2/2013 | Moore ................... G07C 11/00 340/5.2 |
| 2013/0226799 | A1 * | 8/2013 | Raj ...................... G06Q 20/401 705/44 |
| 2015/0229622 | A1 * | 8/2015 | Grigg ...................... G06F 21/31 726/5 |
| 2018/0205822 | A1 * | 7/2018 | Gupta ................... H04M 3/382 |
| 2018/0285865 | A1 * | 10/2018 | Laracey ................ G07F 19/203 |
| 2021/0081937 | A1 * | 3/2021 | Yaqub ............ G06Q 20/40145 |

FOREIGN PATENT DOCUMENTS

| | | | |
|---|---|---|---|
| JP | 2015534138 A | 11/2015 | |
| WO | WO-0118720 A1 * | 3/2001 | ............. G06Q 20/02 |

OTHER PUBLICATIONS

"Manage Customer Identity", Akamai Technologies, [Online]. Retrieved from the Internet: <URL: https://www.akamai.com/us/en/products/security/manage-customer-identity.jsp>, (Accessed Sep. 23, 2019), 3 pgs.

* cited by examiner

```
                                    ┌─ 400

┌─ 402
┌──────────────────────────────────────────────────────┐
│ RECEIVE A REQUEST AT A FIRST ENTITY FROM A SECOND    │
│ ENTITY FOR SECURE DATA OF A USER, WHEREIN THE SECOND │
│ ENTITY IS REMOTE FROM THE FIRST ENTITY               │
└──────────────────────────────────────────────────────┘
                            │
                            ▼  ┌─ 404
┌──────────────────────────────────────────────────────┐
│ TRANSMIT A PROMPT TO A USER DEVICE ASSOCIATED WITH   │
│ THE USER FOR AUTHENTICATION OF THE USER AND          │
│ AUTHENTICATION OF THE REQUEST                        │
└──────────────────────────────────────────────────────┘
                            │
                            ▼  ┌─ 406
┌──────────────────────────────────────────────────────┐
│           RECEIVE A RESPONSE TO THE PROMPT           │
└──────────────────────────────────────────────────────┘
                            │
                            ▼  ┌─ 408
┌──────────────────────────────────────────────────────┐
│ AUTHENTICATE THE USER AND THE REQUEST BASED ON THE   │
│ RESPONSE                                             │
└──────────────────────────────────────────────────────┘
                            │
                            ▼  ┌─ 410
┌──────────────────────────────────────────────────────┐
│ TRANSMIT THE SECURE DATA OF THE USER TO THE SECOND   │
│ ENTITY                                               │
└──────────────────────────────────────────────────────┘
```

*FIG. 4*

ADAPTIVE AUTHENTICATION

TECHNICAL FIELD

Embodiments described herein generally relate to authenticating a person and their personal online accounts, specifically using multiple factors for authentication.

BACKGROUND

Online accounts, such as social media accounts and bank accounts, are a target of hacking and fraud. A person may need to provide access to an online account or information from an online account in a real world or person to person situation. As forms of identification may be easily forged, a person may need to provide multiple authentication types to verify their identity and that they are the person associated with the online account.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 illustrates a flow diagram of an example of a technique for adaptive authentication, according to an embodiment.

DETAILED DESCRIPTION

Many different entities store data about people. The range of entity types is very broad including banks, hospitals, social media services, and online retailers. These entities may store private and sensitive data about a person. For example, a bank may store back account information including account numbers and balances. Another example is a hospital or medical provider which holds medical records for a patient.

These entities secure sensitive user data, but also release the data under the proper authorization. For example, a person may apply for a loan through a new bank. The new bank requires confirmation of the person's assets and thus requests account balance information from the person's current bank. Similarly, a person may visit a new doctor which requests to see the patient's medical history from their previous doctors and medical providers.

Before releasing this data to a new entity, the data holding entity may request authorization from the person to release their personal information. With the ability to create false identifications and other fraudulent forms, multifactor steps may be employed by the data holding entity to validate the requesting entity and the person.

A fraudster may attempt to gain access to another person's sensitive data for fraudulent activities, such as accessing bank account information, applying for loans or credit cards with the sensitive data, or using a medical history to gain access to drugs. Previous authentication methods such as providing a password and a date of birth (or other type of personal data) is no longer secure enough as this data has become readily available and does not necessarily confirm that the person providing the authentication data is the actual person. With the proliferation of the internet and the dark web (e.g., websites containing illicitly obtained and distributed personal data, etc.), user information may be obtained by those intent on committing fraud.

To reduce the incidence of in-person fraudulent authentication, the systems and techniques discussed herein provide adaptive authentication of person that is known to a remote entity but unknown to the in-person entity requesting authentication. For example, a person may visit an entity and request services of that entity, such as banking services or medical treatment. The entity needs to confirm this person is who they say they are. Additionally, because of the services being requested, providing a picture identification may not be sufficient as an identification may be easily forged. In another example, the entity may request secure data about the person that must be supplied by the data holder or trusted authority. For the secure data to be released to the entity, the person must be authenticated remotely.

Figure 1:
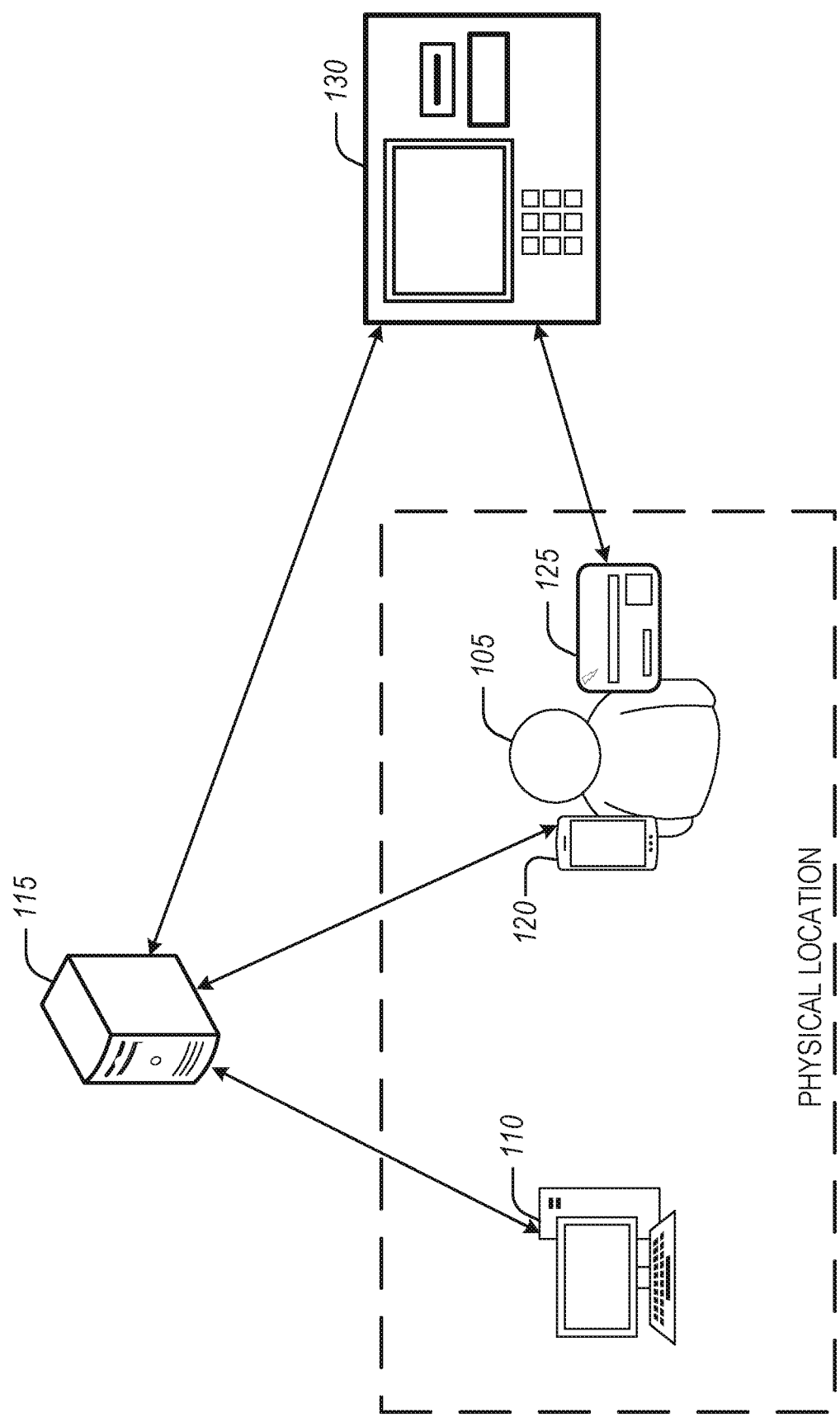
FIG. 1 is an example adaptive authentication process, in accordance with some embodiments.

FIG. 1 is an example adaptive authentication process 100, in accordance with some embodiments. A person 105 may physically visit a service provider 110. Thus, the person 105 and service provider 110 may be in the same location. Based on the services requested of the service provider 110, the service provider may require sensitive and secure information about the person 105. The service provider 110 may make a request to a data holding entity 115 for data about the person 105. For example, the service provider 110 may be a credit union and the data holding entity 115 may be a banking institution. The person 105 may be visiting the credit union to secure a new loan. Thus, the credit union may be requesting data from the banking institution to understand the person's 105 current financial status.

The data holding entity 115, upon receiving the request for data related to the person 105 may attempt to verify that the person 105 approves of releasing the data to service provider 110, as well as confirming person 105 is who they are claiming to be for the service provider 110. The data holding entity 115 may contact the person 105 through their personal mobile device 120, such a smartphone, tablet, or laptop computer. The communication from the data holding entity 115 may be an email, text message, phone call, or communication through an application, such as a banking application if the data holding entity 115 is a bank. The communication to the person 105 on their mobile device 120 may direct the person to perform a verification action such as providing a personal identification number (PIN) or a biometric identification (e.g., fingerprint, facial recognition, iris scan).

In the authentication process 100, the data holding entity 115 may request location information from the mobile device 120, such as global positioning service (GPS) information provided through a GPS sensor of the mobile device 120. The data holding entity 115 may request location information from the service provider 110. The data holding entity 115 may use the mobile device 120 location information and the service provider 110 location information to verify the person 105 is at the location of the service provider 110. For example, if a fraudster was requesting a service at the service provider 110, the data holding entity 115 may request location information of the person the fraudster is alleging to be. The data holding entity 115 may then receive location information from the mobile device of the alleged person which may indicate the alleged person is not in the same location as the service provider 110 and thus a fraudulent action is occurring.

Based on the location information received from the mobile device 120, the data holding entity 115 may communicate a message to the mobile device 120 directing the person 105 to an automated teller machine (ATM) 130. The ATM 130 may be associated with the data holding entity 115, and thus a known and trusted interactive device for verification. The person 105 may be instructed to provide a personal payment card 125, such as a debit card or credit card. The person 105 may insert their payment card 125 and PIN to verify their identity and authorize the release of data to the service provider 110. This identification verification includes multiple factors, such as the location of the person 105, communicating with the mobile device 120 known to the data holding entity 115, providing a payment card 125 that is in possession of the person 105, and providing a PIN known to the person 105.

The term ATM is used as reference to the common device used for receiving a payment card and PIN. However, the term should not be limited to devices for dispensing money. ATM may include similar devices which have payment card reading capabilities, such as credit card transaction machines or card reading devices for smartphones and tablets or point-of-sale (POS) devices.

An additional verification step may be taken such as the data holding entity 115 transmitting a numeric code to the service provider 110 which the person 105 is required to enter at the ATM 130 along with their payment card 125 and PIN. This may be used to complete the circle of authentication in both directions. The ATM may be used in the reverse for authentication as well. For example, the person 105 may be directed to ATM 130 where the person 105 inserts their payment card 125 and PIN. The data holding entity 115, upon receiving a signal from the ATM 130 that the person 105 has accessed the ATM 130, may transmit a quick response (QR) code to the ATM 130. The ATM 130 may display the QR code for the person 105 to capture with the mobile device 120. The decoded QR code may then be transmitted back to the data holding entity 115 for further verification of the person 105. Based on the known location of the ATM 130, this may confirm the location of the person 105 and their mobile device 120.

Figure 2:
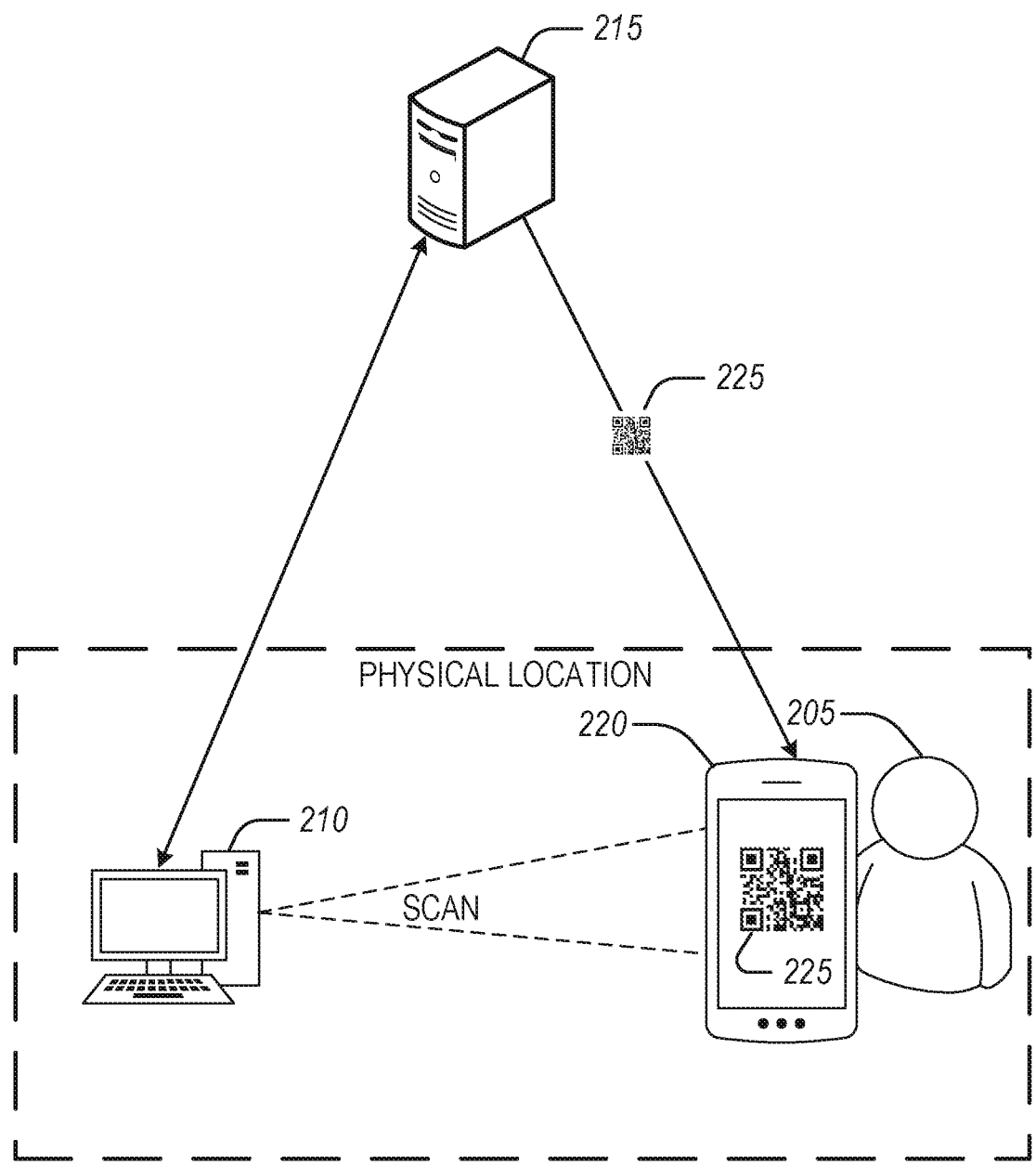
FIG. 2 is an example adaptive authentication process, in accordance with some embodiments.

FIG. 2 is an example adaptive authentication process 200, in accordance with some embodiments. Similar to example authentication process 100, a person 205 may physically visit a service provider 210. Thus, the person 205 and service provider 210 may be in the same location. The service provider 210 may need to authenticate the person 205 as well as request data about the person 205. The service provider 210 may make a request to a data holding entity 215 which provides authenticating services or provides personal data.

The data holding entity 215, upon receiving the request for data related to the person 205 may attempt to verify that the person 205 approves of releasing the data to service provider 210, as well as authenticating person 205 is who they are claiming to be for the service provider 210. The data holding entity 215 may contact the person 205 through their personal mobile device 220, such a smartphone, tablet, or laptop computer. The communication from the data holding entity 215 may be an email, text message, or communication through an application.

The data holding entity 215 may send a unique message or image to the person 205. The unique message may be a numeric sequence or textual phrase. The unique message may be encoded, such as a quick response (QR) code 225. The message, such as QR code 225 may be displayed on the mobile device 220. The code may then be read or scanned by a device of the service provider 210. The information encoded in the code may be transmitted back to the data holding entity 215. This example authentication process 200 completes a circle between the data holding entity 215, the service provider 210, and the person 205 which verifies each participant is who they say they are using the known or registered communication and verification techniques. The data holding entity 215 may perform additional verification techniques, such as verifying the mobile device 220 is in the same location as the service provider 210.

Figure 3:
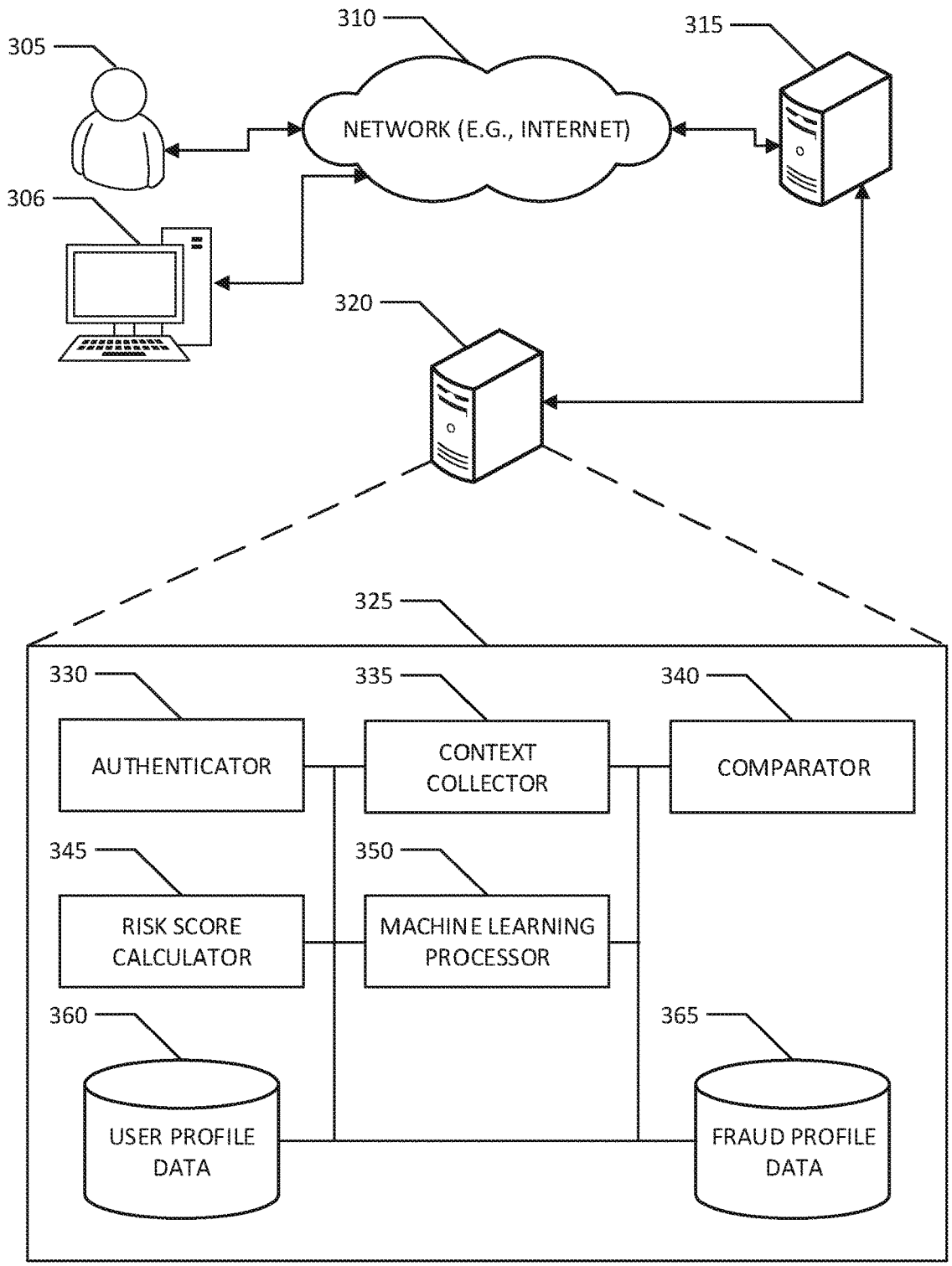
FIG. 3 is a block diagram of an example of an environment and a system for adaptive authentication, according to an embodiment.

FIG. 3 is a block diagram of an example of an environment 300 and a system 325 for adaptive authentication, according to an embodiment. The environment 300 may include a person 305 and a service provider 306 that may be communicating with the adaptive authentication interface system 315, such as data holding entity 115. The communication may be over a network 310 (e.g., the internet, cellular network, wired network, wireless network, etc.). The adaptive authentication interface system 315 may be a gateway to other back-end computer data systems and may aggregate retrieved data use in the authentication process. The adaptive authentication interface system 315 may be communicatively coupled (e.g., via wired network, wireless network, cellular network, shared bus, etc.) to a adaptive authentication system 320 (e.g., a stand-alone server, a cluster of servers, a cloud-computing platform service, a system on a chip, etc.).

The system 325 may be included with the adaptive authentication system 320. In an example, the system 325 may be a multi-layer authentication system. The system 325 may include a variety of components including an authenticator 330, a context collector 335, a comparator 340, a risk score calculator 345, a machine learning processor 350, user profile data 360, and fraud profile data 365.

As described in example adaptive authentication processes 100 and 200, a service provider 306 may contact the adaptive authentication interface system 315 to request data about the person 305. The data available from the adaptive authentication interface system 315 may be secured and may require that the person 305 be authenticated before the secure data is provided. Based on the requested for data from the service provider 306, the authenticator 330 may request a response from the person 305. The authenticator 330 may contact a device of the person 305, such as a mobile device, using contact information from the user profile data 360. For example, the service provider 306 may request access to a banking account information the person 305 may be asked to provide authentication information before the access is allowed. The request for access may trigger an authentication process and authentication information may be requested from the person 305.

The context collector 335 may obtain contextual data associated with authentication information received from the person 305 and the service provider 306. During the authentication process, the person 305 is prompted to provide authentication information such as, for example, a username, a password, identification number (e.g., social security number, driver's license number, account number, etc.), and other personally identifying information (PII). The person 305 may provide the data via a connection to the adaptive authentication interface system 315. Similarly, the service provider 306 may be prompted for identifying information to confirm identity.

The connection may have characteristics that may be observed and collected by the context collector 335. The characteristics may be collected along with other information surrounding the receipt of the authentication information. This contextual information may be used in determining whether additional layers of authentication processing may be used to authenticate the person 305. In an example, the contextual information may include a geographical location of the person 305 (e.g., provided by the person 305, detected via telephone number, network address, etc.), a network topology between a device used to initiate the authentication request and a computing system providing the user interface (e.g., the adaptive authentication interface system 315), line noise present on a communication medium (e.g., telephone line static, background noise, data error rates, etc.) used to initiate the authentication request, a format (e.g., syntactic order, spelling, date format, input mechanism, etc.) in which the authentication information is received, and a veracity (e.g., the correctness of the information provided, likelihood that the information provided could have been illicitly obtained, etc.) of the authentication information received.

The authenticator 330 may work in conjunction with the comparator 340 to determine that the person 305 has passed a first authentication process based on a match between the authentication information and reference authentication information stored in a user profile for the user from the user profile data 360. The user profile data 160 may include a variety of data items that include personal information of the user including name, address, account numbers, identification numbers, usernames, passwords, email addresses, and the like. For example, the user may provide an account number and a social security number and a user profile including the account number may be located in the user profile data and the social security number may be matched to a social security number included in the user profile.

The risk score calculator 345 may generate a risk score for the authentication request based on the contextual data and the authentication data. The risk score may be based on an evaluation of the contextual information using a risk score model to calculate a probability that the authentication information has been provided by an individual to which the user profile corresponds. For example, if the contextual information includes line static and the geographical information shows that the authentication request has been initiated from a service provider 306 with a location distant from a location of the user in the user profile, the risk score may be higher than contextual information with no line noise and a location for the service provider 306 in the vicinity of a home address of the person 305 included in the user profile.

In an example, the machine learning processor 350 may generate a risk score model using a set of training data including training contextual data corresponding to fraudulent authentication requests. The contextual information may be evaluated by the risk score calculator 345 using the risk score model to generate the risk score. The machine learning processor 350 may use a variety of supervised and unsupervised machine learning techniques to generate the risk score model including, for example, linear regression, logistic regression, linear discriminant analysis, decision trees, naïve Bayes, nearest neighbors, vector quantization, support vectors, random forest, boosting, neural networks, deep neural networks, and the like. For example, labeled training data including contextual data from fraudulent authentication attempts may be input into the machine learning processor 350 and the machine learning processor 350 may output a risk score model. After initial model creation, the machine learning processor 350 may begin to evaluate additional data from fraudulent authentication attempts to refine the model.

The machine learning processor 350 may also generate (or refine) a risk score model using contextual data from legitimate authentication requests. By using positive and negative data, the risk score calculator 345 may distinguish between potentially fraudulent and potentially legitimate authentication requests based on evaluation of the contextual data. For example, a risk score of 1 may indicate a strong likelihood of a fraudulent authentication request while a risk score of 0 may indicate a strong likelihood of a legitimate authentication request. Scores between 1 and 0 may provide an indication of the likelihood that the authentication request leans toward fraudulent or legitimate.

The authenticator 330 may identify a second authentication process to be completed for the person 305 based on the risk score. The person 305 may be prompted to undergo additional authentication processes based on the likelihood that the authentication request is fraudulent as indicated by the risk score. The authenticator 330 may provide additional directions to the person 305 for completing the authentication, such as accessing an ATM with their payment card and PIN. In an example, it may be determined that the risk score is outside a threshold (e.g., more likely than not that the authentication request is fraudulent, etc.). The threshold may be variable depending on the data requested. For example, a credit history request may have a lower threshold than a balance inquiry meaning that the credit history may have higher detection sensitivity (e.g., a lower likelihood of fraud may trigger another layer of authentication, etc.) to fraudulent requests. A prompt may be transmitted to the mobile device requesting the person 305 perform additional authentication actions.

In an example, the authenticator 330 may determine that the second authentication process failed. A prompt may be transmitted to the mobile device to attempt a third authentication process. For example, a person 305 may not have their payment card and thus cannot authenticate through the ATM. For example, the person 305 may have passed a first authentication process, but the generated risk score may indicate the authentication request was likely fraudulent. The person 305 may be prompted to provide a second set of authentication information for a second authentication process. The person 305 may have failed the second authentication process because the request could not be completed. The third authentication process may provide a deterrent for continuing the fraudulent authentication request by a fraudster and may allow for a notification to be sent to the service provider 306 that alerts the service provider 306 the person 305 is a fraudster. Using this information, the service provider 306 may refuse services or contact authorities that a fraud is being attempted.

In another example, the authenticator 330 may determine that the second authentication process failed. A fraudulent user profile may be created for the person 305 in the fraud profile database 365 and the contextual information may be stored with the fraudulent user profile. The fraud profile data 365 may include data corresponding to fraudulent authentication requests. The data may include contextual information and PII such as network address, telephone number, etc.

The fraud profile data 365 may include information about the service provider 306 and the data that was provided by the fraudster.

Additionally, a link may be established between the fraud profile data 365 for the fraudster and the profile data for person 305 the fraudster was attempting to impersonate in the user profile data 360. As an example, if a new authentication and data release attempt are made for person 305, their profile in the user profile data 360 may link to a profile in the fraud profile data 365 which can be used to cross reference using the comparator 340 with the new authentication and data release attempt and determine if the attempt may be fraudulent as well. For example, if First Bank branch in Cleveland requests a data release for Tara Byrne and it is determined to be fraudulent based at least on not satisfying the authentication requests and Tara Byrne's home address being in Minneapolis. Then, if a second data release request occurs from a First Bank branch in Cincinnati, the profile data in the fraud profile data 365 linked to Tara Byrne's profile in the user profile data 360 may immediately flag the second data release request as fraudulent based on the similarities to the first data release request.

FIG. 4 illustrates a flow diagram of an example of a technique 400 for adaptive authentication, according to an embodiment. The technique 400 may provide features as described in FIGS. 1-3.

The technique 400 includes an operation 402 to receive a request at a first entity from a second entity for secure data of a user. The first entity may be an adaptive authentication system as described in FIG. 3. The first entity may be a service capable of performing authorization for the release of data. The first entity may be a data holding entity or the first entity may operate as an authorization gatekeeper for another data holding entity. The first entity may be a bank, a medical service, a social network, an online retailer, a government service, or any other type of entity which stores secure data. The second entity may be an authorized service provider that may request data from the first entity as part of their services. For example, a credit union may request information from a bank or a government service or a doctor's office may request data from a hospital or medical service. The second entity may be remote from the first entity and may communicate over a network. The user and the second entity may have a similar physical location. For example, the user may be visiting a credit union branch or may be a patient visiting a doctor's office.

The technique 400 includes an operation 404 to transmit a prompt to a user device associated with the user for authentication of the user and authentication of the request. The first entity may store contact information for the user, such as a phone number or email address. The first entity may transmit a communication, using the contact information, to a mobile device associated with the user, such as a text message or email. The communication may be through an application on the mobile device. The application may be a proprietary application, such as if the first entity is a bank then the proprietary application may be an application for the bank.

The prompt may include direction for the user to perform an action for authentication. The prompt may include codes or images as part of the authentication. The prompt may include a QR code. The prompt may include directions for the user to authenticate at an ATM. The prompt may direct the user to sign in with a username and password through the proprietary application. The prompt may direct the user to provide biometric information such as a fingerprint, iris scan, or facial recognition image.

The technique 400 includes an operation 406 to receive a response to the prompt. Depending of the directions provided in the prompt, the response may be received from the user device, the second entity, or another device, such as an ATM. The response may be received from the second entity and include decoded data from the QR code. For example, a QR code may transmitted to the user device. The user may display the QR code to the second entity which captures the QR code with a camera. The second entity may decode the information in the QR code and transmit the decoded information to the first entity.

The technique 400 includes an operation 408 to authenticate the user and the request based on the response. The technique 400 may include receiving location information from the second entity and receiving location information from the user device. The technique 400, as part of the authentication, may determine the location information of the second entity corresponds to the location information of the user device. This may confirm that the user device of record (e.g., the information for a mobile device stored with the user profile) is at the same location the service request is being made.

The technique 400 includes an operation 410 to transmit the secure data of the user to the second entity. Based on the adaptive authentication methods performed, the requested secure data may be transmitted to the requesting service provider.

The technique 400 further includes an operation to receive data from the ATM including payment card information and a PIN. The technique 400 may include an operation to authenticate the user and the request based on the payment card information and PIN received from the ATM by comparing payment card information and PIN to data stored in a profile for the user. The location or identification of the ATM the payment card information and PIN is received from may be compared to the location and identification of the ATM that was included in the prompt.

The technique 400 further includes an operation to transmit a first code to the second entity. An alphanumerical code or phrase may be provided to the second entity, such as a service provider. The second entity may then tell the code to the person. The person may then enter the code at an ATM, after the person has been verified at the ATM with their payment card and PIN. The technique 400 further includes an operation to receive a second code from the ATM. The ATM may transmit the entered code to the first entity. The technique 400 further includes an operation to verify the first code matches the second code. The first entity authenticates both the second entity and the person by validating the code sent to the second entity is the same code received from the ATM, along with the verification of the person at the ATM.

Based on the type of verified authentications and any risk calculations may alter the type or amount of secure data that is released. For example, when the person verifies their location through an application on their mobile device, the data holding entity may release general background information about the person. More sensitive data, such as medical records, may be released when an additional and higher level authentication can be verified, such as being verified through an ATM. The data released may also depend on the requesting entity or service provider. If the service provider is known by the data holding entity, then secure data may be readily released. For example, if the service provider is a doctor in a known network of medical providers. If the service provider is not known, such as a new credit union, then the data holding entity may request additional authentication of the service provider. The familiarity of the service provider and the data being requested by the service provider may contribute to the risk score.

Figure 5:
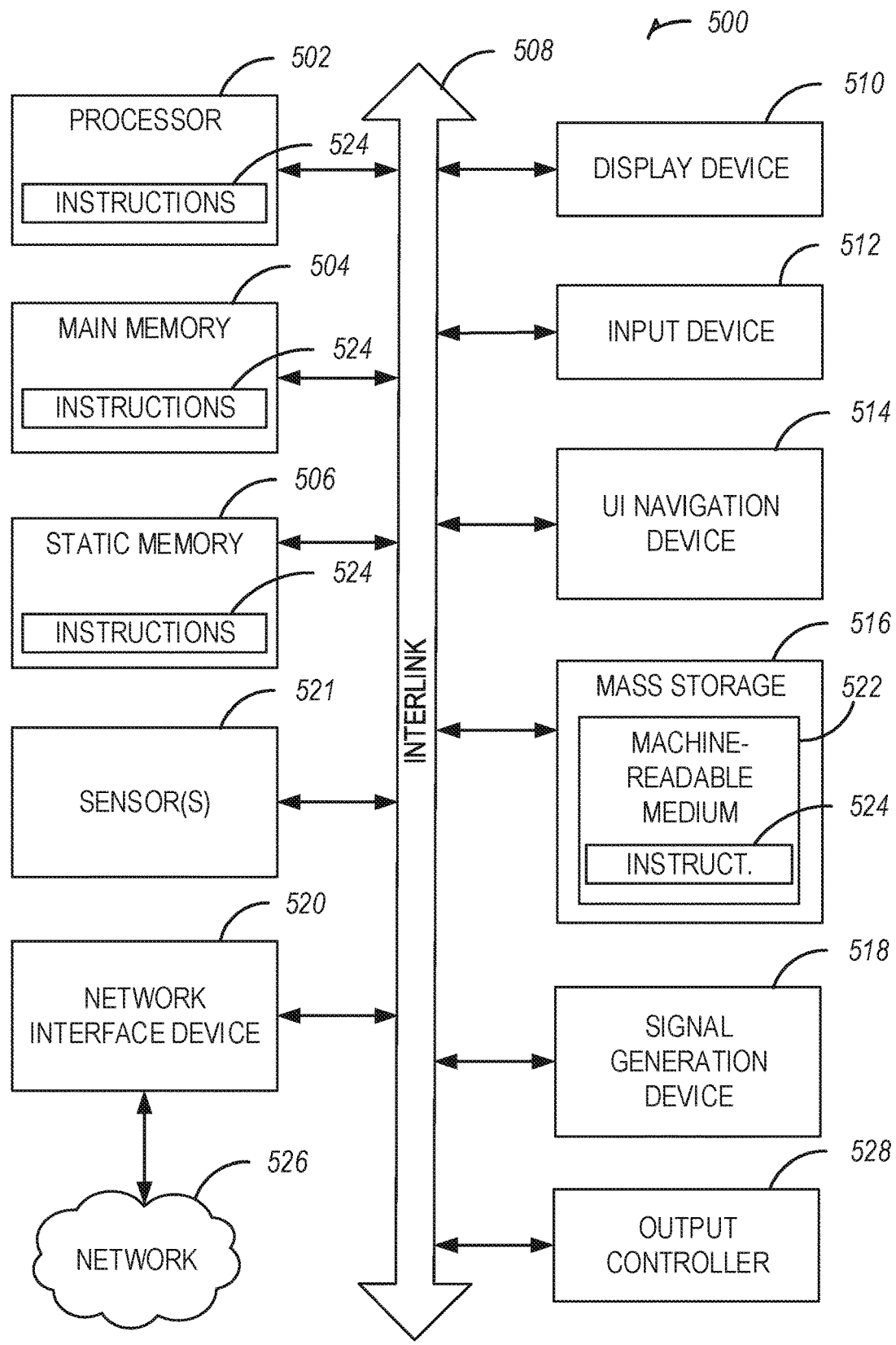
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 500 may include a hardware processor 502 (e.g., a central processing unit (CPU), a graphics processing unit (GPU), a hardware processor core, field programmable gate array (FPGA), or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or used by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for adaptive authentication, comprising:
a first computing device of a first entity comprising:
at least one processor;
and memory including instructions that, when executed by the at least one processor, cause the at least one processor to perform operations comprising:
receiving a request including information identifying a user at the first computing device from a second computing device of a second entity for secure data of the user stored by the first entity,
wherein the request from the second computing device is in response to a query from the user to the second entity located on premise of the second entity;
wherein the second computing device is remote from the first computing device;
responsive to the request, requesting a location of a user device associated with the user from the user device,
the user device being a different computing device than the first or second computing devices;
receiving the location of the user device from the user device;
in response to determining that the received location is within a proximate threshold to the location of the premise, selecting an Automated Teller Machine (ATM) locationally closest to the premise from a plurality of ATM machines associated with the first entity,
transmitting a message to the user device directing the user to authenticate the request at the selected ATM;
receiving data from the selected ATM comprising payment card information and a personal identification number (PIN) corresponding to the user's response to the authentication request,
authenticating the user and the request based on matching the payment card information and the PIN included in the received data with payment card information of the user and a PIN of the user stored in a user profile by the first entity;
and in response to the authentication, transmitting the secure data of the user to the second computing device.

2. The system of claim 1, wherein the operations of authenticating the user and the request comprise:
receiving second location information from the second computing device; and
determining that a location specified by the second location information is within a specified distance to a location specified by the location information of the user device.

3. The system of claim 1, wherein the operations further comprise:
transmitting a first code to the second computing device;
receiving a second code from the ATM; and
verifying the first code matches the second code.

4. A non-transitory machine-readable medium including instructions for adaptive authentication that, when executed by at least one processor, cause the at least one processor to perform operations to comprising:
receiving a request including information identifying a user at the first computing device from a second computing device of a second entity for secure data of the user stored by the first entity, wherein the request from the second computing device is in response to a query from the user to the second entity located on premise of the second entity;

wherein the second computing device is remote from the first computing device;

responsive to the request, requesting a location of a user device associated with the user from the user device, the user device being a different computing device than the first or second computing devices;

receiving the location of the user device from the user device;

in response to determining that the received location is within a proximate threshold to the location of the premise, selecting an Automated Teller Machine (ATM) locationally closest to the premise from a plurality of ATM machines associated with the first entity, transmitting a message to the user device directing the user to authenticate the request at the selected ATM;

receiving data from the selected ATM comprising payment card information and a personal identification number (PIN) corresponding to the user's response to the authentication request, authenticating the user and the request based on matching the payment card information and the PIN included in the received data with payment card information of the user and a PIN of the user stored in a user profile by the first entity;

and in response to the authentication, transmitting the secure data of the user to the second computing device.

5. The non-transitory machine-readable medium of claim 4, wherein the operations of authenticating the user and the request further comprises:

receiving second location information from the second entity; and determining that a location specified by the second location information is within a specified distance to a location specified by the location information of the user device.

6. The non-transitory machine-readable medium of claim 4, wherein the operations further comprise:

transmitting a first code to the second computing device;

receiving a second code from the ATM; and verifying the first code matches the second code.

7. A method of adaptive authentication comprising:

receiving a request including information identifying a user at the first computing device from a second computing device of a second entity for secure data of the user stored by the first entity, wherein the request from the second computing device is in response to a query from the user to the second entity located on premise of the second entity;

wherein the second computing device is remote from the first computing device;

responsive to the request, requesting a location of a user device associated with the user from the user device, the user device being a different computing device than the first or second computing devices;

receiving the location of the user device from the user device;

in response to determining that the received location is within a proximate threshold to the location of the premise, selecting an Automated Teller Machine (ATM) locationally closest to the premise from a plurality of ATM machines associated with the first entity, transmitting a message to the user device directing the user to authenticate the request at the selected ATM;

receiving data from the selected ATM comprising payment card information and a personal identification number (PIN) corresponding to the user's response to the authentication request, authenticating the user and the request based on matching the payment card information and the PIN included in the received data with payment card information of the user and a PIN of the user stored in a user profile by the first entity;

and in response to the authentication, transmitting the secure data of the user to the second computing device.

8. The method of claim 7, wherein to authenticate the user and the request further comprises:

receiving second location information from the second entity; and determining that a location specified by the second location information of the second entity is within a specified distance to a location specified by the location information of the user device.

9. The system of claim 1, wherein the operations further comprise:

transmitting an image encoding a secret value to the ATM;

receiving, from the user computing device, a representation of the image or a decoded value; and wherein the operations of authenticating the user and the request further comprises verifying that the secret value of the image matches the decoded value or a decoding of the representation of the image.

10. The system of claim 1, wherein the secure data is account data of the user.

11. The system of claim 1, wherein the operations of transmitting the message comprise transmitting the message as an email or text message.

12. The non-transitory machine-readable medium of claim 4, wherein the operations further comprise:

transmitting an image encoding a secret value to the ATM;

receiving, from the user computing device, a representation of the image or a decoded value; and wherein the operations of authenticating the user and the request further comprises verifying that the secret value of the image matches the decoded value or a decoding of the representation of the image.

13. The non-transitory machine-readable medium of claim 4, wherein the secure data is account data of the user.

14. The non-transitory machine-readable medium of claim 4, wherein the operations of transmitting the message comprise transmitting the message as an email or text message.

15. The method of claim 7, wherein the method further comprise:

transmitting an image encoding a secret value to the ATM;

receiving, from the user computing device, a representation of the image or a decoded value; and wherein the operations of authenticating the user and the request further comprises verifying that the secret value of the image matches the decoded value or a decoding of the representation of the image.

16. The method of claim 7, wherein the secure data is account data of the user.

17. The method of claim 7, wherein the method of transmitting the message comprise transmitting the message as an email or text message.

* * * * *